United States Patent [19]
Hull et al.

[11] Patent Number: 5,272,942
[45] Date of Patent: Dec. 28, 1993

[54] MULTI-PURPOSE TIRE IRON AND METHOD OF USE

[76] Inventors: Harold L. Hull, 401 Canyon Way #43, Sparks, Nev. 89434; John Daly, P.O. Box 6061, Incline Village, Nev. 89450

[21] Appl. No.: 894,254

[22] Filed: Jun. 8, 1992

[51] Int. Cl.[5] .......................................... B25B 13/06
[52] U.S. Cl. ................... 81/124.4; 81/124.5; 81/124.7; 81/125.1
[58] Field of Search ............ 81/124.4, 462, 437, 81/124.5, 124.6, 124.7, 125.1; 7/100

[56] References Cited

U.S. PATENT DOCUMENTS

| | | | |
|---|---|---|---|
| 3,555,583 | 2/1968 | Mouesel | 7/1 |
| 3,577,818 | 5/1971 | Cramer | 81/462 |
| 3,603,181 | 9/1971 | Shultz | 81/90 |
| 3,745,860 | 7/1973 | Bennett | 81/121 R |
| 3,771,581 | 11/1973 | Johnson | 157/1.22 |
| 3,877,327 | 4/1975 | Erm | 81/121 R |
| 3,877,328 | 4/1975 | Sullivan | 81/185 |
| 3,992,964 | 11/1976 | Osmond | 81/57.31 |
| 4,085,631 | 4/1978 | Bellerose | 81/3 R |
| 4,236,266 | 12/1980 | Hannah | 7/100 |
| 4,620,460 | 11/1986 | Gonzales | 81/124.4 |
| 4,727,782 | 3/1988 | Yang | 81/124.4 |
| 4,856,387 | 8/1989 | Gibson | 81/124.4 |
| 4,882,958 | 9/1989 | McNeeley | 81/124.4 |
| 4,920,835 | 5/1990 | Hendricks | 81/462 |
| 4,926,721 | 5/1990 | Hsiao | 81/177.4 |
| 4,939,960 | 7/1990 | Kinzli | 81/124.4 |
| 5,005,448 | 4/1991 | Main | 81/63 |
| 5,086,674 | 2/1992 | Her | 81/124.4 |

Primary Examiner—D. S. Meislin

[57] ABSTRACT

A method and apparatus is disclosed for removing a hub cap and wheel from a vehicle which has four separate elongated members and the members are so designed as to allow the members to be fitted together to form a cross section and provide at least 31 different socket sizes of engineering choice, yet may be packaged and stored side by side to form a compact carrying package.

14 Claims, 3 Drawing Sheets

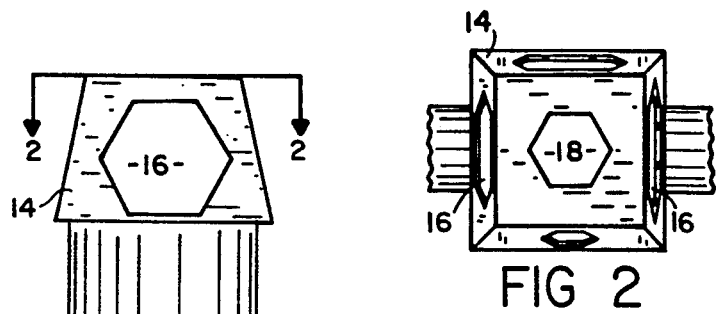

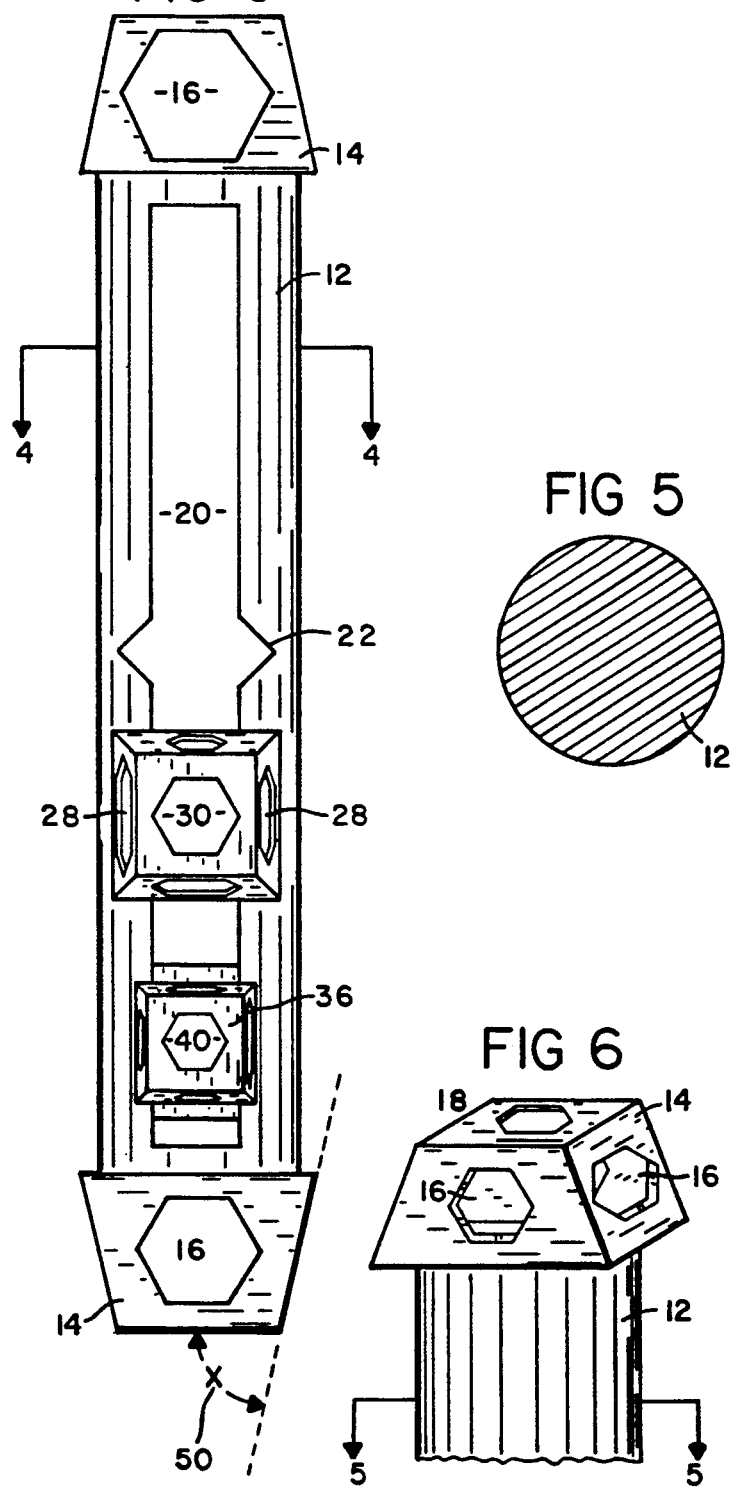
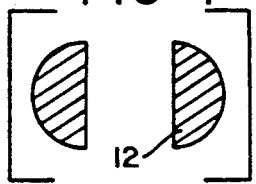
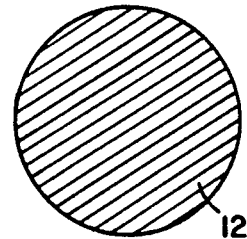
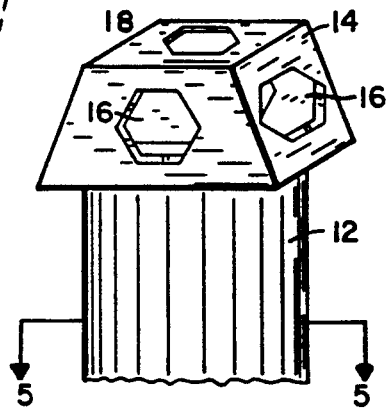

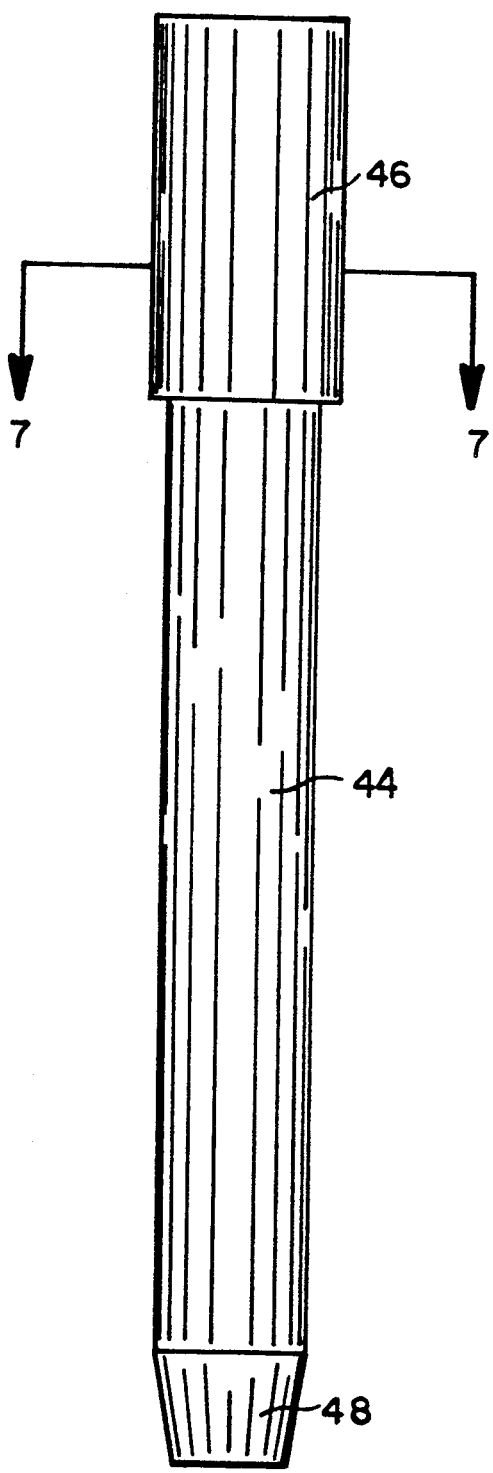
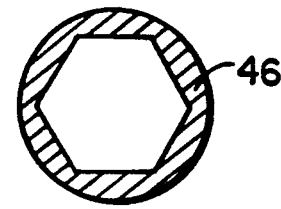
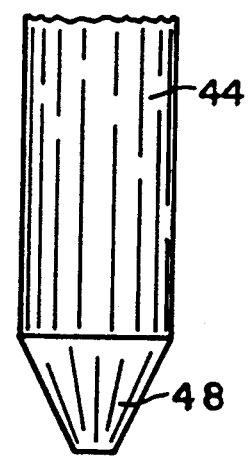
FIG 7
FIG 8
FIG 9

MULTI-PURPOSE TIRE IRON AND METHOD OF USE

FIELD OF THE INVENTION

This invention relates to tire irons or the like, but more particularly to a tire iron having multiple sized sockets.

BACKGROUND OF THE INVENTION

In the past many attempts have been made to provide a tire iron which can be used as a multi-purpose tool, such as U.S. Pat. No. 3,555,583 wherein they provide a tire tool comprising a cross arrangement of two perpendicular disposed components for use as a handle, a wrench, a means to support a wheel when being mounted, a skid and hook element, a hub cap hook and a pair of roller wheels. U.S. Pat. No. 3,992,964 combines a lug wrench having an interchangeable handle, socket ends and a gear housing.

Also, in the prior art is taught multi-purpose hand tools having variably sized socket attachments such as U.S. Pat. Nos. 4,926,721, 4,882,958, 4,727,782, 4,620,460 and 3,745,860. However, none of these references would be acceptable to use as a tire iron as is the present invention.

A further prior art reference as shown in U.S. Pat. No. 4,236,286 teaches a collapsible automotive tool which includes a pair of pivotably interconnected arms disposed in a crossing relationship and having a manually releasable spring detent which locks the arms in a perpendicular open position for use as a wrench. Also included is a socket attachment, a curved claw and a hammer, however, this device has many parts and disadvantages which the present invention addresses.

In studying the prior art it becomes clear that it is desirable to provide a tire iron or the like, which is easy to use, is collapsible and includes means to use many variably sized sockets, a spark plug removal device, and/or an elongated tip for hub cap removal etc.

SUMMARY

It is therefore a primary object to provide a tire iron, or the like, which is of a unique and unusual structure heretofore not taught, which when disassembled allows its parts to lie in a parallel relationship for shipping and storage.

Another object of the present invention is to provide a tire iron, or the like, which is collapsible.

A further object is to provide a tire iron which allows the user to grasp at least one end of a center bar so as to increase leverage.

Still another object is to provide a tire iron which includes a center bar having an elongated slot with substantially its center having a section which accepts and cooperates with at least one end of a crossbar.

Another object is to provide multiple bars which can be used individually or in consert to provide leverage and at least 31 different sizes of sockets in metric and/or standard.

Yet another object of the present invention is to provide at least one crossbar which cooperates with a center bar and includes on its ends means to engage variably sized sockets or the like.

Yet another object is to teach a method of removing a hub cap and wheel from a vehicle.

Still a further object is to provide a tire iron wherein the center bar can be circular, rectangular, etc.

Yet another object is to provide a crossbar having at its ends a spark plug removal device and/or a screwdriver which is used for hub cap removal.

Other objects and advantages will become apparent when taken into consideration with the following drawings and specifications.

BRIEF DESCRIPTION OF THE DRAWINGS

FIG. 1 is a plan view of the device which shows a first, second and third member in a working relationship.

FIG. 2, is an end view of a first member taken at 5—5 of FIG. 1.

FIG. 3, is a side view rotated at 90 degrees to FIG. 1 of the device shown with second and third members in place.

FIG. 4, is a section taken at 4—4 of FIG. 3.

FIG. 5, is a section taken at 5—5 of FIG. 6.

FIG. 6, is a perspective view of one end of a cross bar showing multiple size sockets.

FIG. 7, is a section taken at 7—7 of FIG. 8.

FIG. 8, is a side view of a fourth member showing a spark plug socket on one end and a flat screwdriver on its distal end which may be used for hub cap removal.

FIG. 9, is a partial side view rotated at 90 degrees to FIG. 8 of the screwdriver.

DETAILED DESCRIPTION OF THE DRAWINGS

Referring now in detail to the drawings wherein like characters refer to like elements throughout the various views, in FIG. 1, 10 is an overview of the tire iron with 12 being a first elongated member having at each of its ends 14, multiple socket recepticals 16 and also having sockets 18 in its extreme outer ends, the first member 14 also having an elongated slot 20 substantially running its full length as shown in FIG. 3, slot 20 having an opening 22 larger than slot 20 substantially in the center section of first member 12. First member 12 may be made in the form of a square or round in cross section as shown in FIG. 4 and 5 and is constructed of metal such as steel by moulding, casting or fabrication.

24 is a second elongated member having at each of its ends 26 multiple socket recepticals 28, also having sockets 30 in its extreme outer ends with at least one of the end socket recepticals 28 being of a shape and size to fit through the opening 22 of first member 12 and the main body of second member 24 being of a shape and size to cooperate with the slot 20 of first member 12 to form a substantially close fit between first and second members 12 and 24, respectively, when in a substantially right angle position to each other as shown by arrow 32.

34 is a third elongated member having at each of its ends 36, multiple socket recepticals 38, also having sockets in its extreme outer ends with at least one of the end socket recepticals 38 being of a size and shape to fit through the opening 22 of first member 12, and the main body of third member 34 being of a size and shape to cooperate with the slot 20 of first member 12 to form a substantially close fit between first and third members 12 and 34, respectively, when in a substantially right angle position to each other as shown by arrow 42.

44 is a fourth elongated member having at one of its ends a deep socket 46 such as may be used as a spark plug wrench and at its distal end a flat screwdriver shaped member, 48 which may be used to remove a hub cap or rim cap of a wheel or as a screwdriver.

It will now be noted that the multiple socket recepticals on the first, second and third members have their outer sockets disposed at an angle (X) shown typically in FIG. 3 by reference character 50, which allows each socket in each receptical when placed over bolt or nut (not shown) to firmly surround and capture the bolt or nut (not shown) while allowing the main body of the host member to be at an angle to the work piece. This allows each member to be used independent of the other members and becomes a useful tool in its own right, Yet may be used in conjunction with the other members to form a cross section of choice to use the end sockets of choice.

It will now be seen that we have provided a versatile tire tool which has multiple sockets available in metric and/or standard sizes along with a spark plug wrench and a screwdriver or pry bar for removing a rim or hub cap or the like from a wheel and which may be broken down into a kit of four elongated members which may be packaged or carried side by side in a compact manner heretofore unavailable.

We have provided means for the various members to be assembled by choice to bring to bare on the workpeice the necessary socket either by using the members individually or in concert and the preferred embodiment as shown gives 31 different socket sizes of manufactures choice which can cover most sizes in metric and standard necessary for changing any wheel.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A multi-purpose tool adapted to be used as a tire iron comprising; a first elongated member having a length substantially longer than its circumference, said first member having a head on each of its ends, said first member having a center section, said heads having a socket receptacle in their extreme outer ends, said heads having multiple flat sides, each of said flat sides forming a plane less than 180 degrees to a plane formed by a line drawn parallel to said length, said multiple flat sides each having a socket receptacle, said first member having a traverse bore substantially thru said center section, said first member having a traverse opening forming a slot substantially the length of said first member between said heads, said slot opening into said bore, a second elongated member having a length substantially longer than its circumference, said second member having a head on each of its ends, said last named heads having a socket receptacle in their extreme ends, said last named heads having multiple flat sides, said last named flat sides each forming a plane less than 180 degrees to a plane formed by a line drawn parallel to said length of said second member, said last named flat sides each having a socket receptacle, and at least one of said heads of said second member being of a size and shape to allow said last named head to be inserted thru said traverse bore of said first member, whereby;

forming a crossing relationship between said first and said second members.

2. The multi-purpose tool of claim 1 in which said first and second members, respectively, are made of metal.

3. The multi-purpose tool of claim 1 in which said first elongated member is substantially round in cross section.

4. The multi-purpose tool of claim 1 in which said first elongated member is substantially square in cross section.

5. The multi-purpose tool of claim 1 in which said second member is substantially round.

6. The multi-purpose tool of claim 1 in which said second member is substantially square in cross section.

7. The multi-purpose tool of claim 1 including a third elongated member having a length substantially longer than its circumference, said third member having a head on each of its ends, said last named heads having a socket receptacle in their extreme ends, said last named heads having multiple flat sides, said last named flat sides each forming a plane less than 180 degrees to a plane formed by a line drawn parallel to said length of said third member, said last named flat sides each having a socket receptacle, and at least one of said heads of said third member being of a size and shape to allow said last named head to be inserted thru said traverse bore of said first member, whereby;

forming a crossing relationship between said first and said third members.

8. The multi-purpose tool of claim 7 in which said third member, respectively, is made of metal.

9. The multi-purpose tool of claim 7 in which said third member is substantially round in cross section.

10. The multi-purpose tool of claim 7 in which said third member is substantially square in cross section.

11. The multi-purpose tool of claim 1 including a fourth elongated member, said forth member having on one of its ends a deep socket adapted to be used as a spark plug socket and on its distal end a flat screwdriver shaped member adapted to be used to remove a hub cap of a vehicle.

12. The multi-purpose tool of claim 11 in which said fourth member is made of metal.

13. The multi-purpose tool of claim 11 in which said fourth member is substantially round in cross section.

14. The multi-purpose tool of claim 11 in which said fourth member is square in cross section.

* * * * *